United States Patent
Uh et al.

(10) Patent No.: US 8,263,240 B2
(45) Date of Patent: Sep. 11, 2012

(54) SECONDARY BATTERY HAVING A GASKET WITH COUPLING EXTENSIONS

(75) Inventors: Hwail Uh, Yongin-si (KR); Bumkuk Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 665 days.

(21) Appl. No.: 11/679,145

(22) Filed: Feb. 26, 2007

(65) Prior Publication Data

US 2007/0202364 A1 Aug. 30, 2007

(30) Foreign Application Priority Data

Feb. 27, 2006 (KR) .......... 10-2006-0018708
Oct. 24, 2006 (KR) .......... 10-2006-0103358

(51) Int. Cl.
H01M 2/00 (2006.01)
H01M 2/08 (2006.01)
H01M 2/02 (2006.01)
F16J 15/08 (2006.01)

(52) U.S. Cl. .......... 429/7; 429/174; 429/181; 277/650

(58) Field of Classification Search .......... None
See application file for complete search history.

(56) References Cited

U.S. PATENT DOCUMENTS

| | | | |
|---|---|---|---|
| 5,738,952 A | 4/1998 | Abe | |
| 6,673,489 B2 * | 1/2004 | Fong et al. | 429/181 |
| 2001/0004505 A1 | 6/2001 | Kim et al. | |
| 2003/0008208 A1 | 1/2003 | Yamazaki | |
| 2003/0180582 A1 * | 9/2003 | Masumoto et al. | 429/7 |
| 2004/0170887 A1 | 9/2004 | Masumoto et al. | |
| 2005/0153195 A1 | 7/2005 | Han | |
| 2005/0266279 A1 | 12/2005 | Kim | |
| 2006/0024573 A1 | 2/2006 | Yim et al. | |
| 2006/0073375 A1 | 4/2006 | Hong et al. | |

FOREIGN PATENT DOCUMENTS

| | | |
|---|---|---|
| JP | 2001-196047 | 7/2001 |
| JP | 2003-007282 | 1/2003 |
| JP | 2003-168419 | 6/2003 |

(Continued)

OTHER PUBLICATIONS

English machine translation of Japanese Publication 2003-257385 listed above.

(Continued)

Primary Examiner — Melvin C Mayes
Assistant Examiner — Bijay Saha
(74) Attorney, Agent, or Firm — Christie, Parker & Hale, LLP

(57) ABSTRACT

A secondary battery includes a bare cell having an electrode assembly. The electrode assembly has cathode plates, anode plates and separators insulating the cathode plates from the anode plates. The secondary battery also includes a can housing the electrode assembly, the can having an opening for receiving the electrode assembly and a cap assembly having a cap plate sealing an opening of the can, the cap plate having a terminal through-hole, an electrode terminal inserted into the terminal through-hole, and a gasket insulating the electrode terminal from the terminal through-hole. A protective circuit board is coupled to the bare cell and a molding resin molds the protective circuit board with the bare cell. The gasket includes a coupling extension constraining the molding resin at the cap plate.

8 Claims, 6 Drawing Sheets

FOREIGN PATENT DOCUMENTS

| | | |
|---|---|---|
| JP | 2003-257385 | 9/2003 |
| JP | 2004-362874 | 12/2004 |
| JP | 2005-183176 | 7/2005 |
| JP | 2005-203367 | 7/2005 |
| JP | 2006-012829 | 1/2006 |
| JP | 2006-310032 | 11/2006 |
| KR | 1996-0043311 | 12/1996 |
| KR | 10-2004-0110333 | 12/2004 |
| KR | 10-2005-0080513 | 8/2005 |
| KR | 10-2006-0022556 | 3/2006 |
| KR | 10-2006-0028188 | 3/2006 |
| KR | 10-0571236 | 4/2006 |

OTHER PUBLICATIONS

Korean Patent Abstracts for Registered Publication 10-0571236, Publication No. 1020050080513 A; Date of Publication: Aug. 17, 2005; in the name of Hyun Joong Kim.

English machine translation of Japanese Publication No. 2004-362874 listed above.

English machine translation of Japanese Publication No. 2005-183176 listed above.

English machine translation of Japanese Publication No. 2006-310032 listed above.

Japanese Office action dated Aug. 31, 2010 issued to corresponding application No. JP 2007-015795.

* cited by examiner

SECONDARY BATTERY HAVING A GASKET WITH COUPLING EXTENSIONS

CROSS-REFERENCE TO RELATED APPLICATIONS

This application claims the benefit of Korean Patent Application No. 10-2006-18708, filed on Feb. 27, 2006, and Korean Patent Application No. 10-2006-103358, filed on Oct. 24, 2006, both applications filed in the Korean Intellectual Property Office, the entire content of which is incorporated herein by reference.

BACKGROUND

1. Field of the Invention

The present invention relates to a secondary battery, and more particularly, to a secondary battery having an improved coupling structure of a resin molding part molded on a bare cell.

2. Description of the Prior Art

As video cameras, cellular phones, portable computers and other electronic devices have become more sophisticated, much research has been conducted on secondary batteries used to power such devices. A secondary battery may be, for example, a nickel-cadmium battery, a nickel-hydrogen battery, a nickel-zinc battery, a lithium secondary battery and other similar batteries. Among these batteries, lithium secondary batteries can be recharged and also can be compact yet have a high capacity. Lithium secondary batteries are widely used in the field of high-tech electronic equipment because of their high operating voltage and high energy density per weight.

A lithium secondary battery may include a bare cell formed by inserting an electrode assembly having cathode plates, anode plates and separators into a metal can, injecting an electrolyte into the can, and sealing the can. The bare cell formed as described above typically has an electrode terminal insulated from the can. The electrode terminal forms one electrode of the lithium secondary battery, and the can itself forms the other electrode of the lithium secondary battery. Accordingly, the cathode plates and the anode plates of the electrode assembly may be connected with either the can and the electrode terminal.

By connecting the bare cell with safety devices, for example, a protecting circuit module (PCM) including a secondary protective element, such as a bimetal or a positive temperature coefficient (PTC), and a protective circuit board and inserting in a battery pack or molding using resin, the lithium secondary battery is formed. The safety devices of the lithium secondary battery are connected with the cathode and the anode, preventing the risk of explosion of the battery by blocking the electric current when the voltage of the battery is rapidly increased due to, for example, the increase in battery temperature or over-charging/over-discharging.

A conventional general lithium secondary battery includes a bare cell and a protective circuit board on the upper part of the bare cell. The lithium secondary battery also includes a secondary protective element arranged on the upper part of the bare cell. The secondary protective element may be formed on the side or the top of the bare cell depending on the construction of the lithium secondary battery.

The bare cell includes a can, an electrode assembly and a cap assembly. The can is a metal container, the top of which is opened, having an approximately hexahedronal shape. The electrode assembly includes cathode plates, separators and anode plates which are all housed in the can along with electrolyte. After the electrode assembly is inserted through an opened top opening of the can, the top opening is sealed by the cap assembly.

Lithium secondary battery with a resin, the cap assembly, the secondary protective element and the protective circuit board can be protected. The can and a resin molding part form the exterior of the lithium secondary battery, and the electrode terminals are exposed on the upper part of the resin molding part.

However, when a conventional lithium secondary battery is assembled, the material of the resin molding part fixedly coupling the battery protection components with the bare cell is different from the material of the bare cell and the contact area of the resin molding part is narrow. Accordingly, the adhesive strength between the components is low, and the resin molding part cannot be positioned in its molding state without twisting of the resin molding part occurring. As such, lead plates are typically expanded or the reinforcing structure of the secondary protective element is formed separately, resulting in higher manufacturing costs.

SUMMARY OF THE INVENTION

A secondary battery is provided including a bare cell having an electrode assembly including cathode plates, anode plates and separators insulating the cathode plate from the anode plate, a can housing the electrode assembly, the can having an opening for receiving the electrode assembly, and a cap assembly. The cap assembly includes a cap plate sealing an opening of the can, the cap plate having a terminal through-hole, an electrode terminal inserted into a terminal through-hole, and a gasket insulating the electrode terminal from the terminal through-hole. The secondary battery further includes a protective circuit board coupled to the bare cell, a molding resin molding the protective circuit board with the bare cell.

The gasket includes a coupling extension to constrain the molding resin in the bare cell. The coupling part may be a stopper formed integrally with and protruding radially from the gasket. The stopper may include a horizontal portion extending generally parallel to the cap plate and the horizontal portion may be located on an exterior facing side of the cap plate. The stopper may further include a leg extending perpendicularly toward the cap plate from the horizontal portion of the stopper and the stopper may taper outwardly, for example, in a smooth configuration or in a stepped configuration, from an inner diameter at an exterior facing side of the cap plate. The stopper may includes a plurality of recesses adapted to be filled with the molding resin.

In accordance with the present invention, a further embodiment of the present invention is provided. The secondary battery has an electrode terminal including a coupling part constraining the resin molding in the bare cell. The electrode terminal may include a head electrically connected to the protective circuit part and on which the stopper is formed; and a body integral with the head and coupled with the cap plate with an insulating gasket interposed between the electrode terminal and the cap plate. A diameter of the stopper may be larger than the diameter of the head of the electrode terminal. The stopper may include a step and/or recesses for further constraining the resin molding.

DETAILED DESCRIPTION

Figure 1:
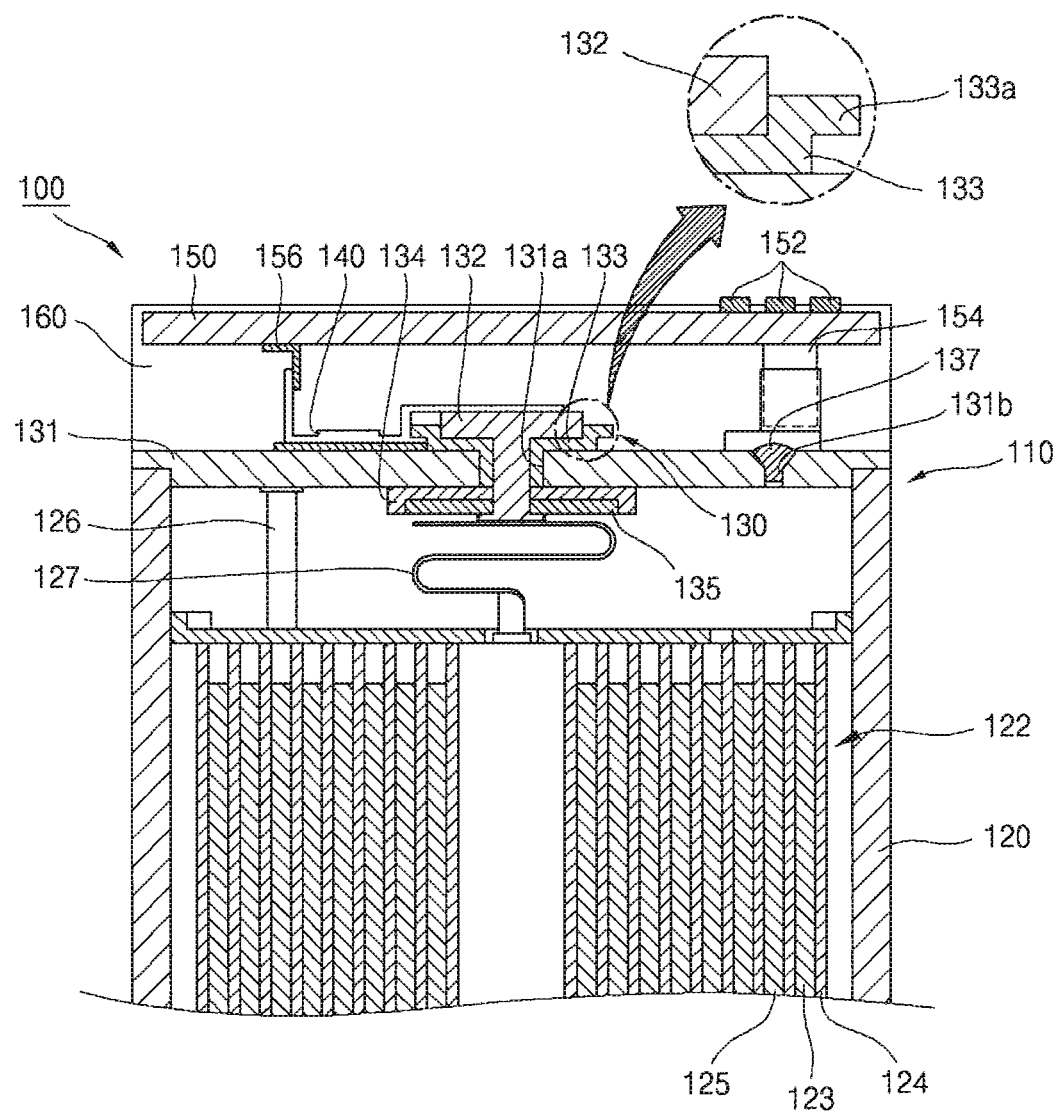
FIG. 1 is a sectional view of a secondary battery according to an exemplary embodiment of the present invention.

As illustrated in FIG. 1, a lithium secondary battery 100 according to an exemplary embodiment of the present invention includes a bare cell 110 and a protective circuit board 150 connected to the bare cell.

The bare cell 110 includes a can 120, an electrode assembly 122 housed in the can 120, and a cap assembly 130 sealing the can 120. Furthermore, a secondary protective element 140 is formed on the upper part of the cap assembly 130.

The can 120 may be metal having an approximately hexhedronal shape, and the can 120 itself may serve as a terminal. The top of the can 120 has an opening through which the electrode assembly 122 is insertable.

The electrode assembly 122 includes cathode plates 123, anode plates 125 and separators 124. After the cathode plates 123 and the anode plates 125 are stacked with the separators 124 interposed between them, they may be wound in a jellyroll configuration. A cathode tab 126 is welded to the cathode plates 123, and an end of the cathode tab 126 protrudes from the electrode assembly 122. An anode tab 127 is welded to the anode plates 125, and an end of the anode tab 127 protrudes from the electrode assembly 122.

The cap assembly 130 includes a cap plate 131, an electrode terminal 132, an insulating plate 134, and a terminal plate 135.

The cap plate 131 may be a metal plate formed to correspond to the opening of the can 120. The electrode terminal 132, for example, an anode terminal, is inserted through the cap plate 131 and is coupled therewith. The anode tab 127 may be welded to the electrode terminal 132 and may be electrically coupled therewith. Furthermore, the cathode tab 126 is welded to the cap plate 131. A terminal through-hole 131a, through which the electrode terminal 132 may pass, is formed on the center of the cap plate 131, and an electrolyte inlet 131b sealed by a plug 137 may be formed adjacent the terminal through-hole.

In order to insulate the anode terminal 132 from the cap plate 131, a tubular gasket 133 is interposed between them. Moreover, the terminal plate 135 electrically connected with the bottom of the anode terminal 132 is formed on the under surface of the cap plate 131, and the insulating plate 134 is arranged to electrically insulate the terminal plate 134 and the anode terminal 132 from the cap plate 131. The insulating plate 134 may be an insulating plate or a tape made of, for example, polypropylene (PP), polypropylene sulfide (PPS) or polyimide (PI) having resistance to an electrolyte.

The cathode plate 123 and anode plate 125 may be alternatively formed such that the electrode terminal 132 is a cathode terminal and the cap plate 131 and can 120 is an anode terminal.

In FIG. 1, the secondary protective element 140 is connected between the anode terminal 132 and the protective circuit board 150. The secondary protective element 140 may be a PTC element, a bimetal or a thermal fuse. When a PTC element is used as the secondary protective element 140, insulating tape is wound around the secondary protective element to insulate it from the cap plate 131 and other components.

The protective circuit board 150, formed by mounting a plurality of electric elements on a printed circuit board (PCB) with a wiring pattern formed thereon, controls all operations including charging and discharging of the lithium secondary battery. The protective circuit board 150 is electrically connected to the electrode terminal 132 of the bare cell 110 and the can 120 by board lead plates 154, 156 and is electrically connected to the electrode assembly 122. Electrode terminals 152 which electrically contact the lithium secondary battery 100 to an external instrument (not shown) may be formed on the protective circuit board 150.

By molding the lithium secondary battery 100 with a resin, the cap assembly 130, the secondary protective element 140 and the protective circuit board 150 can be protected. The can 120 and a resin molding part 160 form the exterior of the lithium secondary battery 100 allowing the electrode terminals 152 of the protective circuit board 150 to be exposed through the resin molding part 160.

Figure 2:
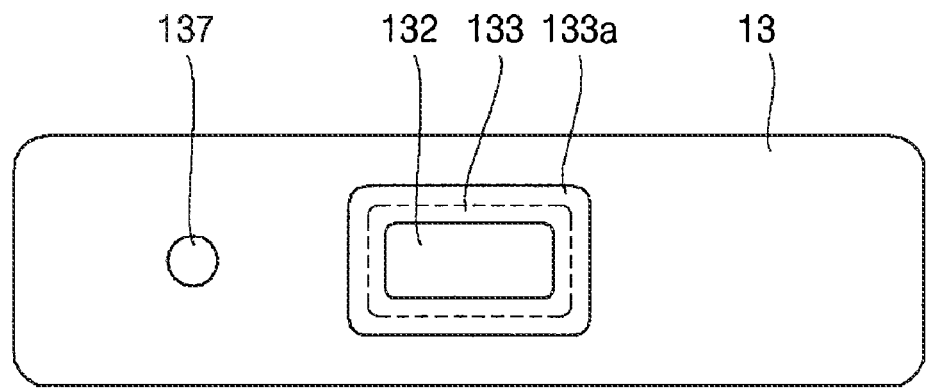
FIG. 2 is a top view of a bare cell from in which a resin molding part has been removed.

Referring now to FIGS. 1 and 2, a stopper 133a is extended in the gasket 133 to firmly couple the resin molding part 160 with the metal cap plate 131. The stopper 133a, which protrudes from the gasket 133, may be integrally formed with the gasket.

In one exemplary embodiment, the stopper 133a is horizontally formed on one end of the gasket 133, i.e., in a direction parallel to the cap plate 131. Accordingly, the empty space between the stopper 133a and the cap plate 131 may be filled with resin, thus increasing the coupling force between the cap plate 131 and the resin molding part 160.

In one exemplary embodiment, the resin molding part 160 is injected into the empty space between the cap plate 131 and the stopper 133a and is solidified. Since the secondary protective element 140 and the protective circuit board 150 are protected by the resin molding part 160 and the resin molding part is firmly coupled by the stopper 133a, the secondary protective element 140 is firmly coupled to the cap plate 131.

FIGS. 3, 4, 5, 6 and 7 are partial sectional views illustrating exemplary embodiments of secondary batteries according to the present invention.

Figure 3:
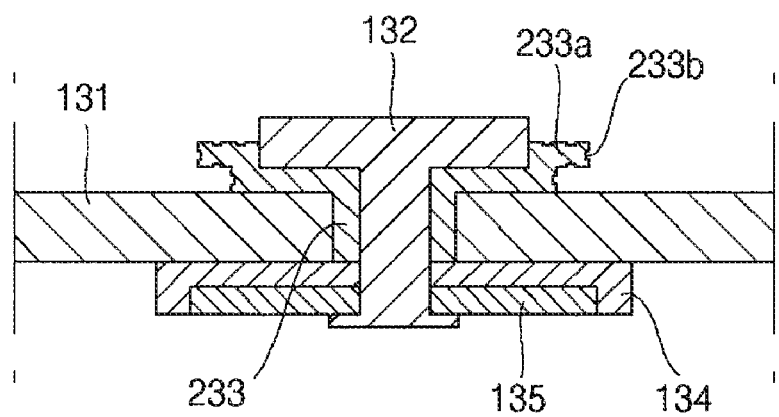
FIGS. 3, 4, 5, 6 and 7 are partial sectional views illustrating the structure of gaskets according to exemplary embodiments of the present invention.

A gasket 233 illustrated in FIG. 3 may be constructed by forming a plurality of recesses 233b on the surface which contacts the resin molding part when a lithium secondary battery is assembled. The recesses 233b may also be formed on the outer surface of the stopper 233a of the gasket 233 horizontally protruding from the gasket. When a lithium secondary battery is assembled, the recesses 233b are filled with resin, providing a strong coupling between the resin molding part and the cap plate 131.

Figure 4:
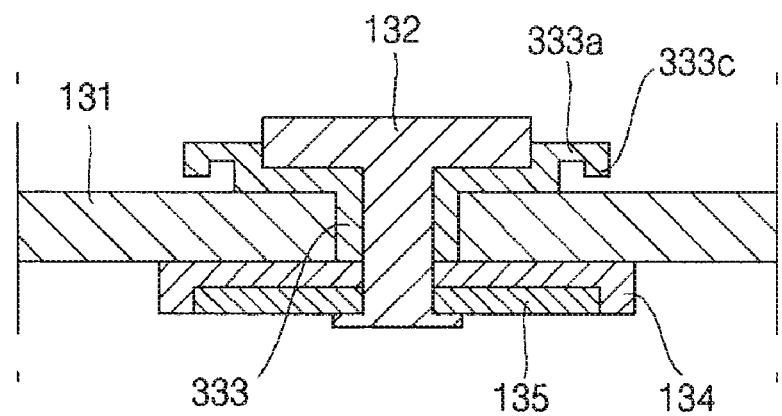

A gasket 333 illustrated in FIG. 4 may be constructed including a stopper 333a protruding perpendicularly from the gasket 333 and a leg 333c protruding perpendicularly from the stopper 333a. The leg 333c may be spaced from the cap plate 131 by a certain distance so that resin can flow into the space between the leg and the stopper 333a. The gasket 333 improves adhesive strength, significantly decreasing the likelihood that the resin molding part 160 will be separated from the cap plate 131. Moreover, the resin molding part is less likely to be separated or twisted with respect to the cap plate 131.

Figure 5:
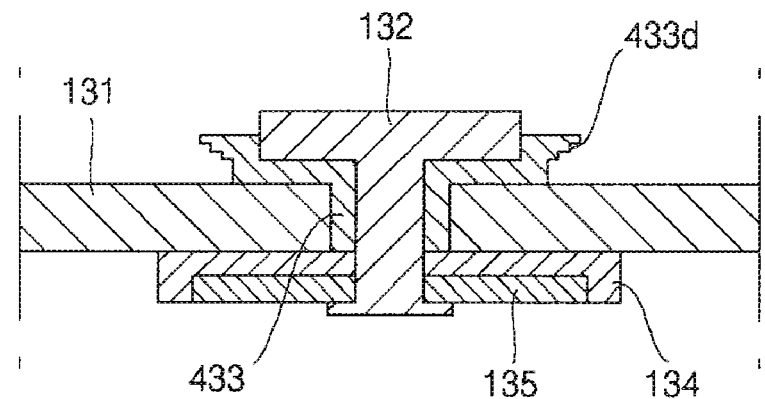

A gasket 433 illustrated in FIG. 5 includes a stopper 433*d* which tapers outwardly in a stepped configuration from a first end of the gasket to a second end. For reasons similar to the gaskets described above, the gasket 433 improves the adhesive strength between the resin molding part and the cap plate 131.

Figure 6:
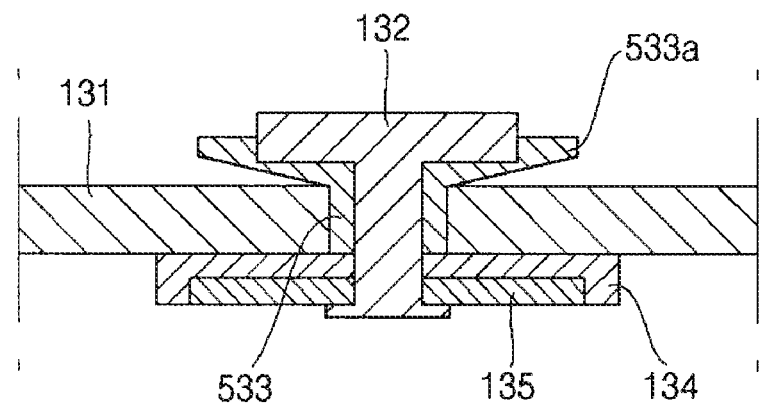

In the sectional view illustrated in FIG. 6, a top head 533*a* of a gasket 533 tapers outwardly in a smooth configuration from a first end to a second end. A space between the top head 533*a* and the cap plate 131 is filled with the resin molding part, thus increasing the coupling force of the resin molding part with respect to the cap plate 131.

Figure 7:
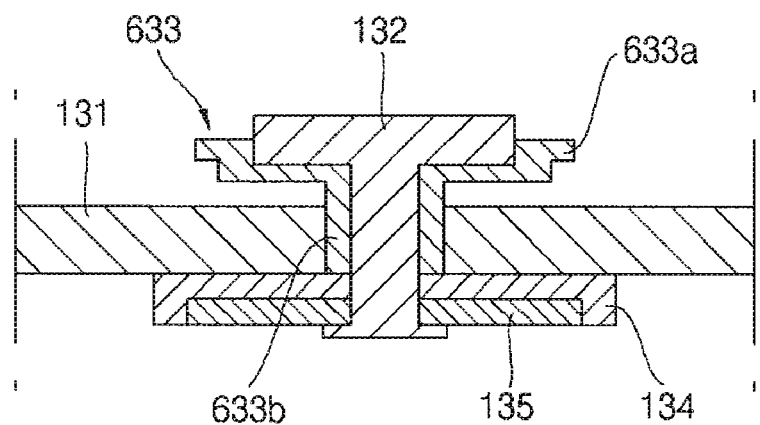

In a gasket 633 illustrated in FIG. 7, a body 633*b* integrally formed with a head 633*a* of the gasket 633 extends above a top surface of the cap plate 131. As such, a space between the head 633*a* of the gasket and the cap plate 131 may be filled with the resin molding part, thus increasing the coupling force of the resin molding part with respect to the cap plate 131.

Figure 8:
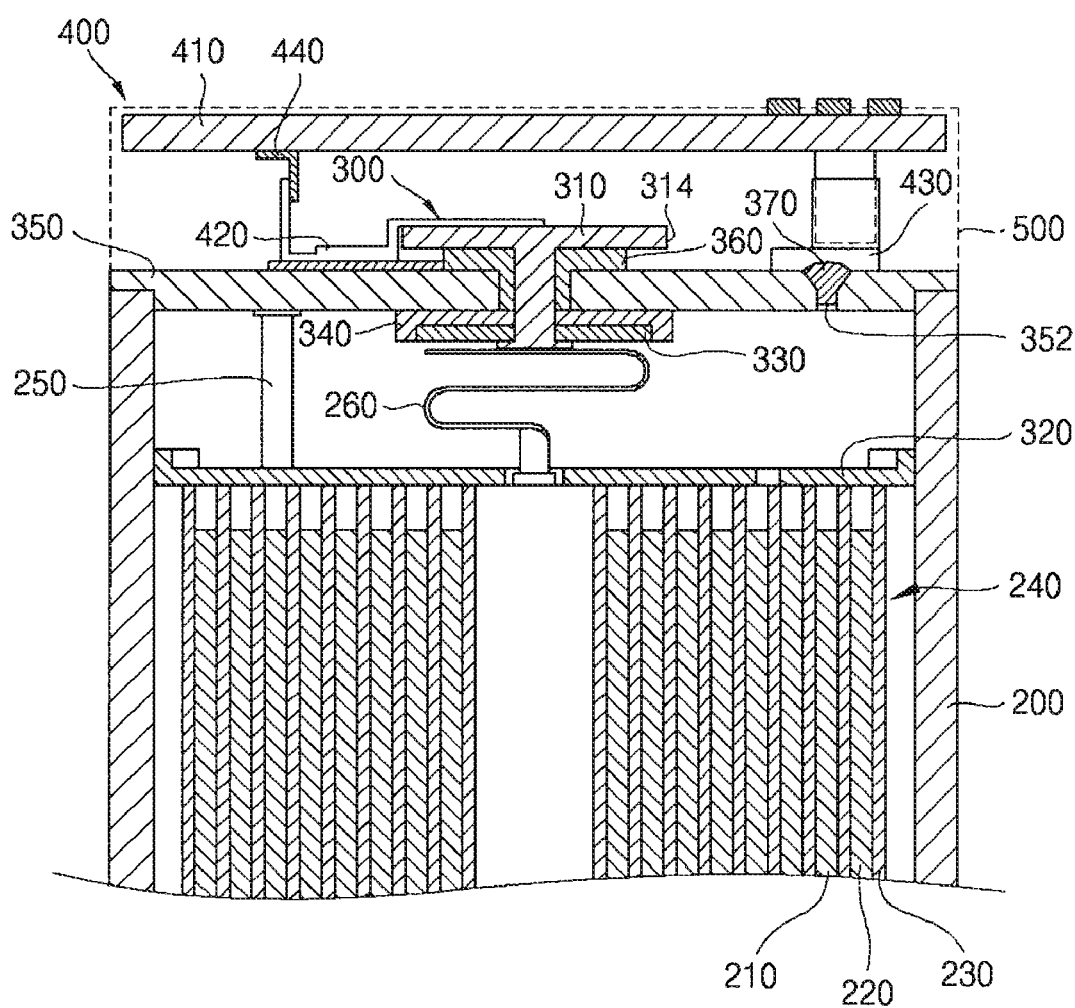
FIG. 8 is a sectional view of the upper side of a secondary battery according to another exemplary embodiment of the present invention.
Figure 9:
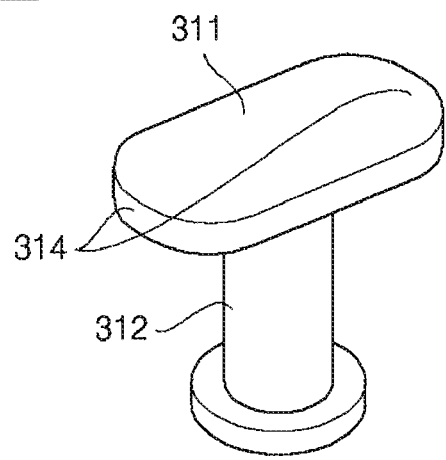
FIG. 9 is a perspective view illustrating an electrode terminal of the secondary battery of FIG. 8.

With reference to FIGS. 8 and 9, a secondary battery according to another exemplary embodiment includes an electrode assembly 240 formed by stacking cathode plates 210 provided with a cathode tab 250, anode plates 220 provided with a anode tab 260 and separators 230 and then winding the stacked plates. The secondary battery further includes a case 200 for housing the electrode assembly 240 and having an opening on one end, a cap assembly 300 to seal the opening of the case 200, the cap assembly being electrically connected with the cathode tab 250 and the anode tab 260, a protective circuit part 400 provided on a printed board with an electronic circuit for a safety device and an electric terminal, the protective circuit part being electrically connected to the cap assembly 300, and a resin molding part 500 that couples a portion of the cap assembly with a portion of the protective circuit part by a molten resin.

The cathode plates 210 have a cathode active material layer formed on a cathode current collector and the anode plates 220 have an anode active material layer formed on an anode current collector. Separators 230 are arranged between the cathode plates and the anode plates to prevent a short circuit between the electrode plates 210, 220 and to enable ions to move. The cathode tab 250 is bonded to the cathode plates 230 and is electrically connected with a cap plate 350 and the anode tab 260 is bonded to the anode plates 220 and is electrically connected with an electrode terminal 310.

More specifically, the cathode active material layer may include a layered compound containing lithium, a binder for improving the coupling force, and a conducting material for improving the conductivity. The cathode current collector may be aluminum, and serves not only as a passage for an electric charge produced in the cathode active material layer, but also as a support for the cathode active material layer. The cathode active material layer may be attached to a wide surface of the cathode current collector, and a cathode non-coating part absent the cathode active material layer is formed on one side end of the cathode plates. The cathode tab 250 may be bonded to the cathode non-coating part.

Additionally, the anode plates 220 include an anode current collector and an anode active material layer. The anode active material layer may include hard carbon or graphite, and a binder for improving the coupling force between the active material particles. The anode current collector may be aluminum, and not only serves as a passage for an electric charge produced in the anode active material layer, but also serves to support the anode active material layer. The anode active material layer is attached to a wide surface of the anode plates 220, and an anode non-coating part absent the anode active material layer is formed on one side end of the anode plates. The anode tab 260 may be bonded to the anode non-coating part.

The separators 230 may be interposed between the cathode plates 210 and the anode plates 220 to insulate the cathode plates 210 from the anode plates 220 and to pass the electric charge. The separators 230 may be PE or polypropylene PP, however, the material of the separators is not limited thereto. The separators 230 may contain an electrolyte and may be in a liquid phase or in the form of a gel.

The cathode tab 250 and the anode tab 260 serve to electrically connect the electrode assembly 240 to the electric terminal of the external instrument, and are bonded to the cathode non-coating part of the cathode plates 210 or the anode non-coating part of the anode plates 220. The cathode tab 250 and the anode tab 260 may be aluminum or an alloy thereof, or nickel or an alloy thereof. However, the material of the cathode and the anode tabs is not limited thereto.

The case 200 houses the electrode assembly 240, an insulating case 320 and an electrolyte. The case may have a generally hexahedronal shape and may be aluminum, but the material of the case is not limited thereto. The cap plate 350 may be welded or thermally fusion-bonded to the case to seal it.

The cap assembly 300 includes an electrode terminal 310 that electrically connects the anode tab 260 to an anode lead plate and is provided with a stopper, the insulating case 320, a terminal plate 330 electrically connected to the electrode terminal 310, an insulating plate 340 that insulates the outer surface of the terminal plate 330 and has a hole for connecting the electrode terminal 310 to the terminal plate 330, the cap plate 350, a gasket 360 that insulates the electrode terminal 310 from the cap plate 350, and an electrolyte inlet plug 370 that seals an electrolyte inlet 352 of the cap plate 350.

The electrode terminal 310 and the gasket 360 which insulates the electrode terminal may be inserted into a center hole of the cap plate 350. The insulating case 320 may separate the cathode tab 250 and the anode tab 260 to prevent a short circuit between the cathode plates 210 and the anode plates 220. The terminal plate 330 may be connected with the electrode terminal 310 and the anode tab 260. The insulating plate 340 may be formed in a shape to enclose the terminal plate 330.

The electrolyte inlet 352 through which electrolyte may be injected is located on the cap plate 350 and may be sealed by the electrolyte inlet plug 370 welded or otherwise secured to the electrolyte inlet. The cap plate 350 may also include a safety vent (not shown) for preventing explosion of the lithium secondary battery due to increased internal pressure.

The protective circuit part 400 is positioned above the cap plate 350 and controls all operations of the secondary battery including charging/discharging. The protective circuit part 400 includes a protective circuit board 410 mounted with a plurality of electric elements on a printed circuit board with a wiring pattern formed thereon. The protective circuit board 410 is electrically connected with the anode lead plate 440 and the cathode lead plate 430. The anode lead plate 440 connects the electrode terminal 310 with the protective circuit board 410. An insulator (not shown) may be located between the anode lead plate 440 and the cap plate 350 to provide insulation between the two components. Additionally, the cathode lead plate 430 electrically connects the cap plate 350 with the protective circuit board 410. A secondary protective element 420 may be formed between the anode lead plate 440 and the printed board 410, and may be a PTC element, a bimetal or a thermal fuse. When a PTC element is used as the secondary protective element, insulating tape may be wound around the exterior of the PTC element to insulate it from the cap plate 350.

The resin molding part 500 is formed by molding a portion of the protective circuit part 400 and a portion of the cap plate 350 with a resin. The electrode terminal 310 may include a coupling part constraining the resin molding part with respect to the cap plate 350. For example, the electrode terminal 310 may be formed such that a head 311 thereof protrudes from the gasket 360.

The electrode terminal 310 includes a head 311 and a body 312. The head 311 may have a plate shape and may be formed to have a surface area larger than the surface area of the gasket 360. The body 312 may be integrally formed with the head 311.

A space may be created between the head 311 and the cap plate 350 in which resin molding may be filled. As such, the coupling force constraining the resin molding part 500 in the cap plate 350 may be improved.

Figure 10:
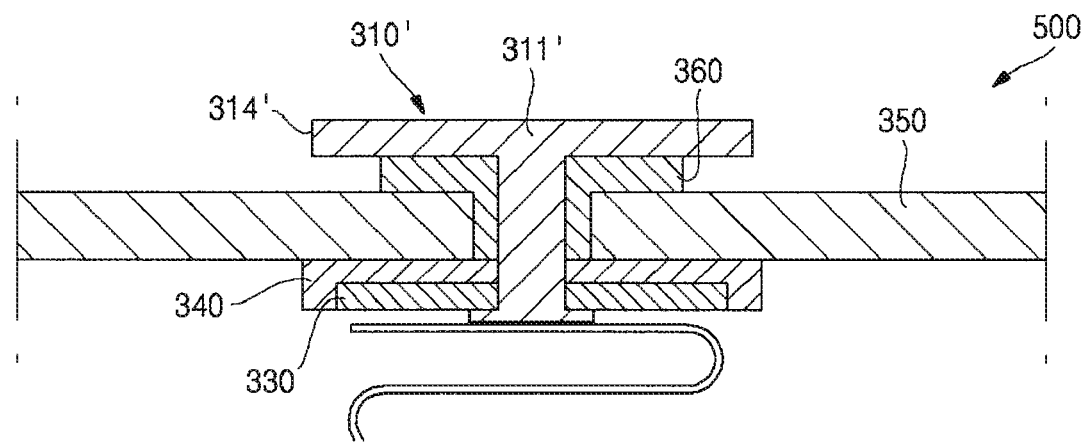
FIGS. 10, 11 and 12 are partial sectional views of exemplary embodiment of electrode terminals of the present invention.

According to another exemplary embodiment, the resin molding part may be constrained by forming a stopper on the head of an electrode terminal. With reference to FIG. 10, an electrode terminal 310' includes a stopper 314' having a head 311' with a diameter greater than the diameter of the gasket 360. By means of the stopper 314', the resin molding part 500 is constrained. As described above, the stopper 314' formed on the electrode terminal 310 constrains a portion of the resin molding part 500 and the resin molding part 500 is firmly coupled with the cap plate 350.

Figure 11:
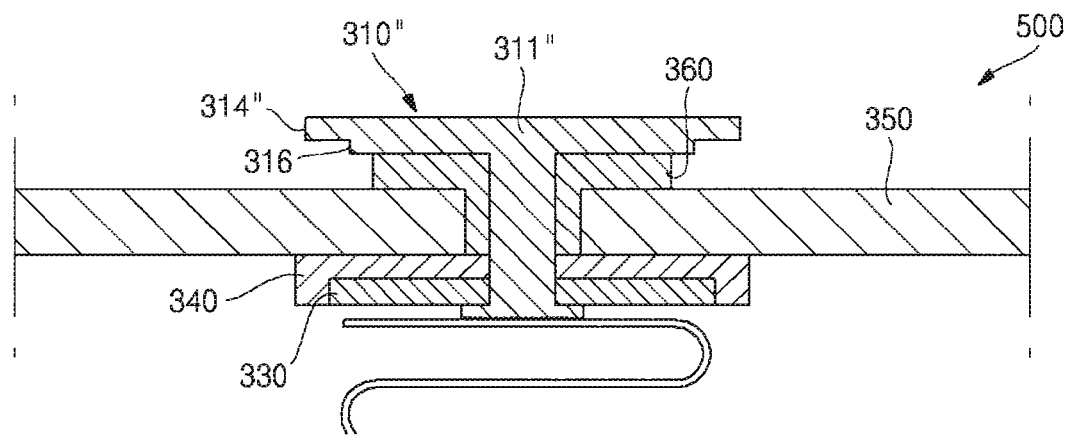

According to FIG. 11, a step 312 for further constraining the resin molding part is provided on a stopper 314" of an electrode terminal 310". As described above, the stopper 314" is provided with the step 312, and thus the coupling force between the cap plate 350 and the resin molding part 500 is improved.

Figure 12:
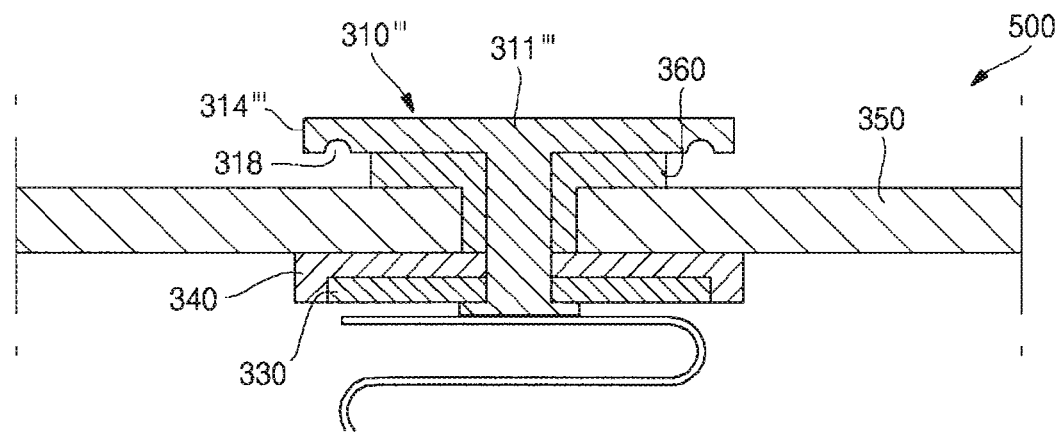

According to FIG. 12, a head 311" of an electrode terminal 310" is provided with a stopper 314" having a diameter greater than the diameter of the gasket 360, and recesses 313 formed on a surface of the stopper. As above, the stopper 314" improves the vertical coupling force between the cap plate 310 and the resin molding part 500. The recesses formed on the stopper 314" may be formed on the under surface of the stopper as well as the circumferential surface thereof. The number and location of the recesses is determined based on the size of the secondary battery and the structure of the cap assembly and the protective circuit part.

As described above, a secondary battery is provided having an improved gasket structure insulating the electrode terminal and the cap plate. Accordingly, the adhesive strength of the resin molding part forming the external appearance is improved.

Although exemplary embodiments of the present invention have been described for illustrative purpose, those skilled in the art will appreciate that various modifications and changes thereof are possible without departing from the scope and spirit of the present invention, and all modifications and changes are intended to be included within the description of the claims.

What is claimed is:

1. A secondary battery comprising:
a bare cell including:
an electrode assembly having cathode plates, anode plates and separators insulating the cathode plates from the anode plates;
a can housing the electrode assembly, the can having an opening for receiving the electrode assembly; and
a cap assembly having:
a cap plate sealing an opening of the can, the cap plate having a terminal through-hole;
an electrode terminal inserted into the terminal through-hole; and
a gasket insulating the electrode terminal from the terminal through-hole, wherein the gasket has a side wall extending in a first direction generally away from the electrode assembly and contacting the electrode terminal and a coupling extension extending from the side wall of the gasket in a second direction different from the first direction, the coupling extension being spaced in its entirety from the cap plate and configured to allow a portion of the molding resin to be located between the coupling extension and the cap plate;
a protective circuit board coupled to the bare cell; and
a molding resin molding the protective circuit board with the bare cell, the molding resin filling the space between the coupling extension and the cap plate to increase the coupling force between the cap plate and the molding resin.

2. The secondary battery as claimed in claim 1, wherein the coupling extension is integral with and protrudes radially from the gasket.

3. The secondary battery as claimed in claim 2, wherein the coupling extension includes a horizontal portion extending generally parallel to the cap plate.

4. The secondary battery as claimed in claim 3, wherein the horizontal portion is located above an exterior-facing side of the cap plate.

5. The secondary battery as claimed in claim 3, wherein the coupling extension further comprises a leg extending substantially perpendicularly toward the cap plate from the horizontal portion.

6. The secondary battery as claimed in claim 1, wherein the coupling extension includes a plurality of recesses adapted to be filled with the molding resin.

7. The secondary battery as claimed in claim 2, wherein the coupling extension tapers outwardly from an inner diameter at an exterior facing side of the cap plate.

8. The secondary battery as claimed in claim 2, wherein the coupling extension steps from a first diameter proximal to an exterior facing side of the cap plate to a second diameter distal from the exterior facing side of the cap plate, the second diameter being larger than the first diameter.

* * * * *

UNITED STATES PATENT AND TRADEMARK OFFICE
CERTIFICATE OF CORRECTION

PATENT NO.         : 8,263,240 B2
APPLICATION NO.    : 11/679145
DATED              : September 11, 2012
INVENTOR(S)        : Hwail Uh et al.

It is certified that error appears in the above-identified patent and that said Letters Patent is hereby corrected as shown below:

In the Claims

Column 8, Claim 1, line 13        Delete "an"

Insert -- the --

Signed and Sealed this
Twenty-fourth Day of September, 2013

Teresa Stanek Rea
*Deputy Director of the United States Patent and Trademark Office*